United States Patent [19]  
Lailach et al.

[11] Patent Number: 4,731,230  
[45] Date of Patent: Mar. 15, 1988

[54] PROCESS FOR THE PREPARATION OF TICL4

[75] Inventors: Günter Lailach; Walter Deissmann; Karl-Heinz Schultz, all of Krefeld, Fed. Rep. of Germany

[73] Assignee: Bayer Aktiengesellschaft, Fed. Rep. of Germany

[21] Appl. No.: 67,499

[22] Filed: Jun. 29, 1987

[30] Foreign Application Priority Data

Jul. 11, 1986 [DE] Fed. Rep. of Germany ....... 3623322

[51] Int. Cl.$^4$ ..................... B01D 37/02; C01G 23/02
[52] U.S. Cl. ..................... 423/77; 210/713; 210/777; 210/778; 210/779; 423/80; 423/81; 423/492
[58] Field of Search .............. 423/69, 74, 77, 78, 423/79, 80, 492, 81; 210/713, 779, 777, 778

[56] References Cited

U.S. PATENT DOCUMENTS 3,760,071  9/1973  Brzozowski et al. ................ 423/77
3,871,874  3/1975  Winter ................................. 423/77
3,939,244  2/1976  Piccolo et al. ...................... 423/77
3,963,585  6/1976  Winter et al. ....................... 423/492

FOREIGN PATENT DOCUMENTS 1225625  7/1963  Fed. Rep. of Germany ...... 423/492

OTHER PUBLICATIONS

"Filter Aids", Wheeler, Filtration, Jan./Feb. 1964, pp. 41-43.
Chemical Engineers' Handbook, 5th ed., Percy et al, eds., McGraw-Hill Book Co., 1973, pp. 19-63.

Primary Examiner—William R. Dixon, Jr.
Assistant Examiner—Jeffrey Edwin Russel
Attorney, Agent, or Firm—Connolly and Hutz

[57] ABSTRACT

An improved process for the preparation of $TiCl_4$ comprising
(a) chlorinating a raw material containing titanium and vanadium impurities to produce a crude $TiCl_4$ reaction product,
(b) separating the crude reaction product into solid by-products and $TiCl_4$-containing liquid,
(c) reacting the $TiCl_4$-containing liquid with a reducing agent whereby vanadium impurities are converted into solid compounds, and
(d) separating $TiCl_4$ from the solid vanadium compounds, is improved by adding solid products of the vanadium reduction reactions to the crude $TiCl_4$ reaction product prior to the separating step (b).

11 Claims, 3 Drawing Figures

PROCESS FOR THE PREPARATION OF TICL4

This invention relates to a process for the preparation of $TiCl_4$ by the chlorination of raw materials containing titanium in the presence of reducing agents, separation of solid metal chlorides by cooling of the reaction gases and subsequent condensaton of the crude $TiCl_4$ and reduction of vanadium compounds present in the crude $TiCl_4$ with the formation of solid reaction products, followed by distillation.

BACKGROUND OF THE INVENTION

Titanium dioxide pigments are nowadays prepared not only by the sulphate process but also by the combustion process in which $TiCl_4$ and oxygen are directly converted into titanium dioxide pigments by heating to an elevated temperature.

The $TiCl_4$ required for this purpose is obtained by the chlorination of materials containing titanium, such as ilmenite, leucoxene or rutile, in the presence of carbon. The crude $TiCl_4$ obtained is contaminated with numerous other chlorides and with chlorine, the main impurities being the chlorides of iron, aluminium and silicon as well as the chlorides and oxychlorides of vanadium.

Removal of these impurities is essential if the $TiO_2$ pigments are to have a pure white color.

Most of the impurities, such as the chlorides of iron, aluminium and silicon, may be removed by distillation. The distillation of crude $TiCl_4$ results in the formation of thickened suspensions of the solid metal chlorides and of extremely finely divided residues of crude chlorination products which are difficult to evaporate to dryness, especially if they contain a high proportion of $AlCl_3$. This distillation therefore entails a high energy consumption and/or losses in $TiCl_4$ yield.

It would therefore be preferable to separate the solid metal chlorides and the finely divided residues of the solid raw material of the chlorination process by filtration and to dry the filter cake. This method, however, becomes very expensive due to the difficulty of filtering the finely divided solids.

The product obtained after removal of the solid impurities still contains vanadium in the form of $VOCl_3$ or $VCl_4$.

The removal of $VOCl_3$ and $VCl_4$ from the titanium tetrachloride by distillation is costly due to the similarity of their boiling points.

These compounds are therefore converted into solid, low valency vanadium chlorides by reduction.

A product containing only low vanadium concentrations (so-called pure $TiCl_4$) may then be obtained by distillation.

Known methods of purifications use, for example, $H_2S$ (DE-A No. 1 923 479), animal and vegetable oils, fats, waxes, resins and soaps, liquid or gaseous hydrocarbons, oils, fats, alcohols, ketones, organic acids, amines (CH-A No. 365 393, CH-A No. 262 267, DE-C No. 867 544, FR-A No. 1 466 478, FR-A No. 1 460 362), metals and metal salts (BE-A No. 539 078, DE-A No. 1 922 420, DE-B No. 1 271 693, U.S. Pat. Nos. 3,915,364, 2,871,094, 2,753,255, 2,560,424, 2,555,361, 2,530,735 and 2,178,685).

The purification of titanium tetrachloride with special cyclic aliphatic or aromatic compounds (DE-C No. 2 329 045) and with special amines (DE-C No. 2 325 924) is particularly advantageous.

It was an object of the present invention to provide a particularly advantageous process for the purification of $TiCl_4$ which would not have the disadvantages described above.

BRIEF DESCRIPTION OF THE INVENTION

It has surprisingly been found that the removal of the solid substances from crude $TiCl_4$ by filtration may be greatly facilitated by using the solid reaction products of the reduction of vanadium compounds as filtering aids for the filtration of crude $TiCl_4$.

The solid reaction products are mainly the solid, low valency vanadium compounds, oxidized reducing agent and possibly residues of unreacted reducing agent.

DETAILED DESCRIPTION

The present invention thus relates to a process for the preparation of $TiCl_4$ by the chlorination of starting materials containing titanium and vanadium as an impurity, separation of the solid metal chlorides by cooling of the reaction gases followed by condensation of the crude $TiCl_4$, and reduction of the vanadium compounds present in the crude $TiCl_4$ to form solid reduction reaction products, followed by distillation, characterised in that the solid reduction reaction products are used as filtering aids for the filtration of the crude $TiCl_4$.

In one embodiment of the process according to the invention, the solid reduction reaction products used are substances which were separated from $TiCl_4$ by filtration before distillation.

In another embodiment of the process, the solid reduction reaction products used are the substances which are obtained as distilland sump during or after distillation.

According to yet another embodiment of the process, the solid reduction reaction products used are substances which are separated by filtration of the distillation sump.

When filtration of the crude $TiCl_4$ is carried out, the solid reduction reaction products are added to the crude $TiCl_4$ and/or used as precoat layer.

Reduction of the vanadium compounds is preferably carried out with organic hydrocarbons or organic amines.

Preferred embodiment of this type are anthracene, aniline or diphenylamine.

According to one particularly preferred embodiment of the process, the organic amine used is diphenylamine and 2.5 to 5 kg of diphenylamine are used per kg of vanadium.

Reduction of the vanadium compounds with organic hydrocarbons or organic amines is preferably carried out at 80° to 125° C.

In another preferred embodiment of the process, crude $TiCl_4$ containing chlorine and solid substances is dechlorinated before filtration because the presence of elementary chlorine increases the quantity of reducing agent used.

BRIEF DESCRIPTION OF THE DRAWING

The process according to the invention will now be explained in more detail with reference to FIGS. 1 to 3.

DETAILED DESCRIPTION OF THE DRAWING

Figure 1:
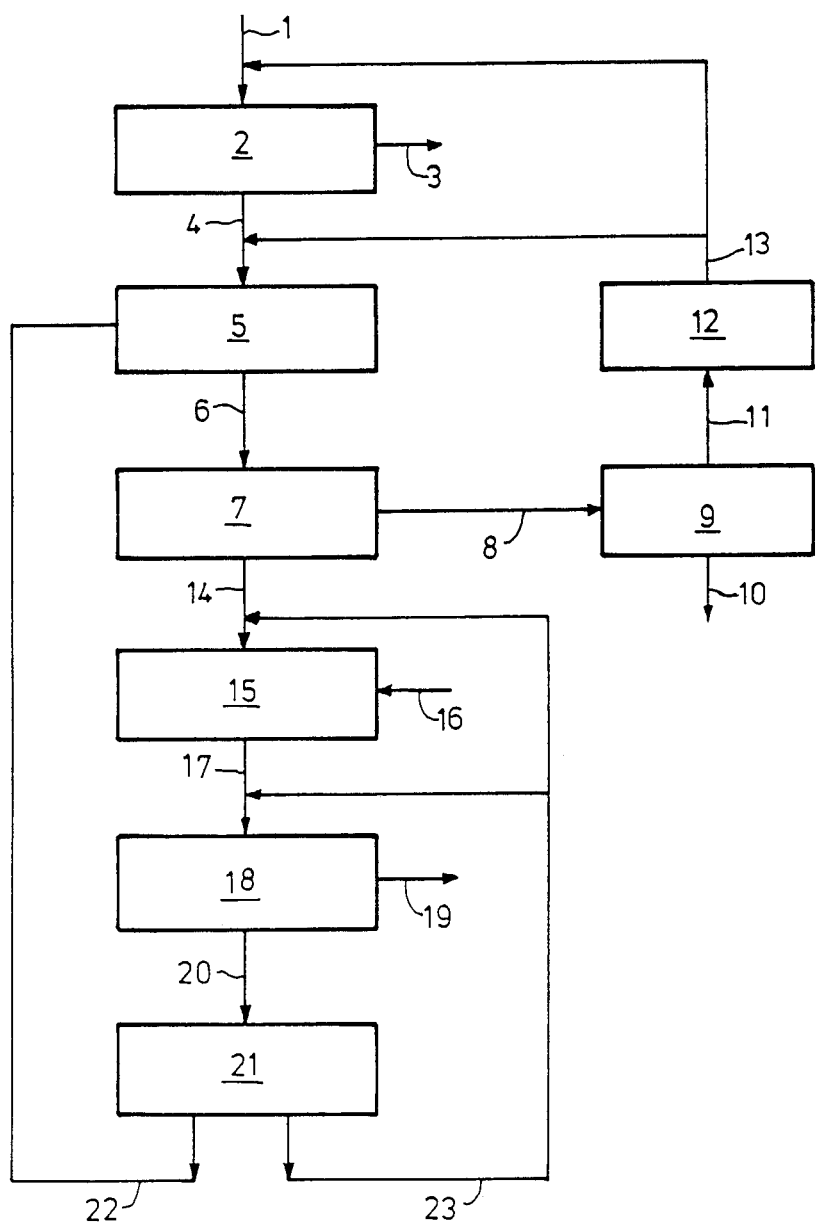
FIG. 1 illustrates the process of this invention in a block diagram flowchart.

In FIG. 1, crude $TiCl_4$ (1) containing chlorine and solids is first dechlorinated to prevent excessive consumption of reducing component.

The removal of chlorine (2) may be carried out in a dechlorination column or by heating in a stirrer vessel to 100°–130° C., the chlorine (3) released from the $TiCl_4$ being displaced from the vessel by nitrogen.

The dechlorinated crude $TiCl_4$ (4) is mixed (5) with the filter cake II (22) which is the solid reaction products of reduction of the vanadium compounds and $TiCl_4$ adhering thereto. The resulting mixture (6) is filtered, preferably at 50°–100° C. (7), the solids components of the filter cake II (22) acting as filtration aids which loosen up the filter cake I (8) and thereby substantially increase the efficiency of filtration.

The filtrate I (14) now contains mainly $VOCl_3$, $VCl_4$ and $SiCl_4$ as impurities. The vanadium compounds are reduced by the addition of reducing agent (16) to the filtrate I (14). The vanadium compounds are reduced in filtrate I (14) as described in DE-C Nos. 2 325 924 or 2 329 045 preferably at temperatures in the range of from 80° to 125° C. $TiCl_4$ (together with $SiCl_4$) is removed as pure $TiCl_4$ (19) from the resulting suspension (17) by distillation (18). The apparatus used for distillation is preferably a heated stirrer vessel, a horizontal evaporator or a forced circulation evaporator. The $SiCl_4$ is optionally removed from the $TiCl_4$ in a column connected in series with the distillation apparatus.

The sump (20) formed in the process of distillation (18) is filtered (21), preferably at 70° to 100° C. The filtrate II (23) obtained from this filtration II (21) is added to the filtrate I (14) either after or, preferably before reduction of the vanadium compounds (15).

The filter cake II (22) is discharged into the mixer (5) as described above to serve as filtration aid for the filtration I (7).

The filter cake II (22) may alternatively be used as precoat layer for the filtration I (7), in which case the filter is not purified after filtration II (21) but subjected to the dechlorinated crude $TiCl_4$ (4).

Part of the filter cake II (22) may be added to the crude $TiCl_4$ (4) as filtering aid while the remainder may be used as precoat layer.

The filter cake I (8) from filtration (7) contains all the solid substances resulting from the purification of the crude $TiCl_4$. Drying (9) of the filter cake (8) may be carried out in driers with heating surfaces heated indirectly at the ambient pressure or at higher or lower pressures or it may be carried out directly on the filter with inert gas heated to 100°–120° C., preferably nitrogen. The $TiCl_4$ vapor (11) formed in the process is condensed (12) and the condensate (13) is added to the crude $TiCl_4$ (1,4) before or, preferably, after dechlorination (2). After this initial drying, the filter cake may be further dried by blowing with an inert gas, preferably nitrogen, preferably at a temperature of 50°–110° C., before it is discharged from the filter. The resulting mixture of inert gas and $TiCl_4$ vapor may be transferred to the stage of dechlorination of crude $TiCl_4$ (2) for expelling the chlorine, either immediately or after condensation of the major proportion of its $TiCl_4$. The dried solids (10) are then removed from the process.

Figure 2:
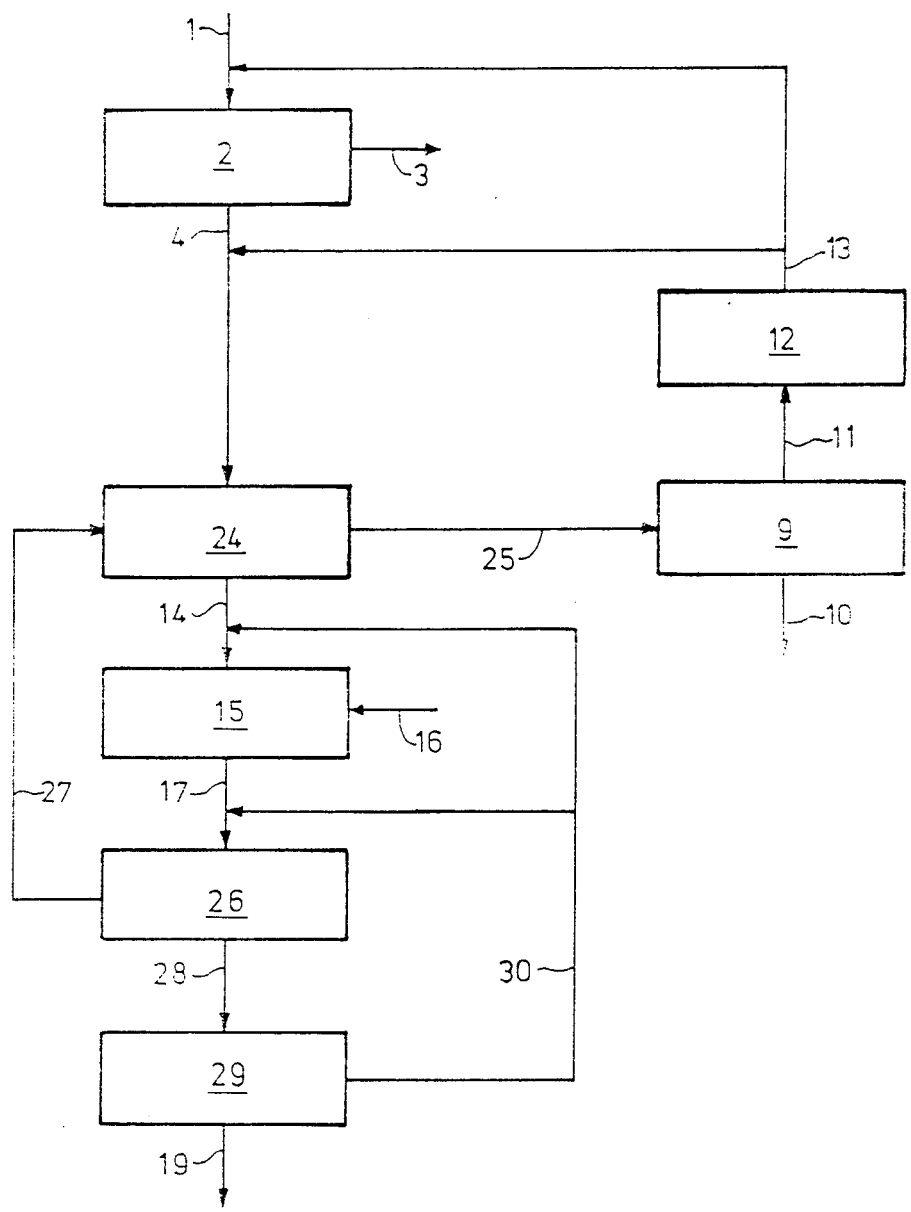
FIG. 2 illustrates second embodiment of this invention by a flowchart block diagram.

FIG. 2 illustrates a variation of the process according to the invention in which the filter cake II (27) is used as precoat layer for filtration I (24). The filter is therefore not cleaned after filtration II (26) but charged with dechlorinated crude $TiCl_4$ (4).

A filter cake (25) composed of two layers is obtained. This filter cake (25) also contains all the substances resulting from the purification of $TiCl_4$ and is dried by a method analogous to that of FIG. 1.

The vanadium compounds (15) in filtrate I (14) are then reduced as in FIG. 1. The procedure differs from that of FIG. 1, however, in that filtration II (26) is carried out immediately after reduction of the vanadium compounds (15). Distillation of $TiCl_4$ (29) is carried out on a filtrate II (28) which is free from solids. Circulation evaporators or horizontal evaporators are suitable for this purpose, optionally with a column arranged in series with the evaporator to enable the $SiCl_4$ to be removed from the pure $TiCl_4$ (19). The sump (30) of the distillation (29) is returned to the suspension (17).

The filter cake II (27) from filtration II (26) may alternatively also be mixed with the dechlorinated crude $TiCl_4$ (4) as in FIG. 1, in which case the solid components of filter cake II (27) used as filtering aids improve the efficiency of filtration I (24).

If desired, a proportion of filter cake II (27) may be added to the crude $TiCl_4$ while another portion is used as precoat layer.

Figure 3:
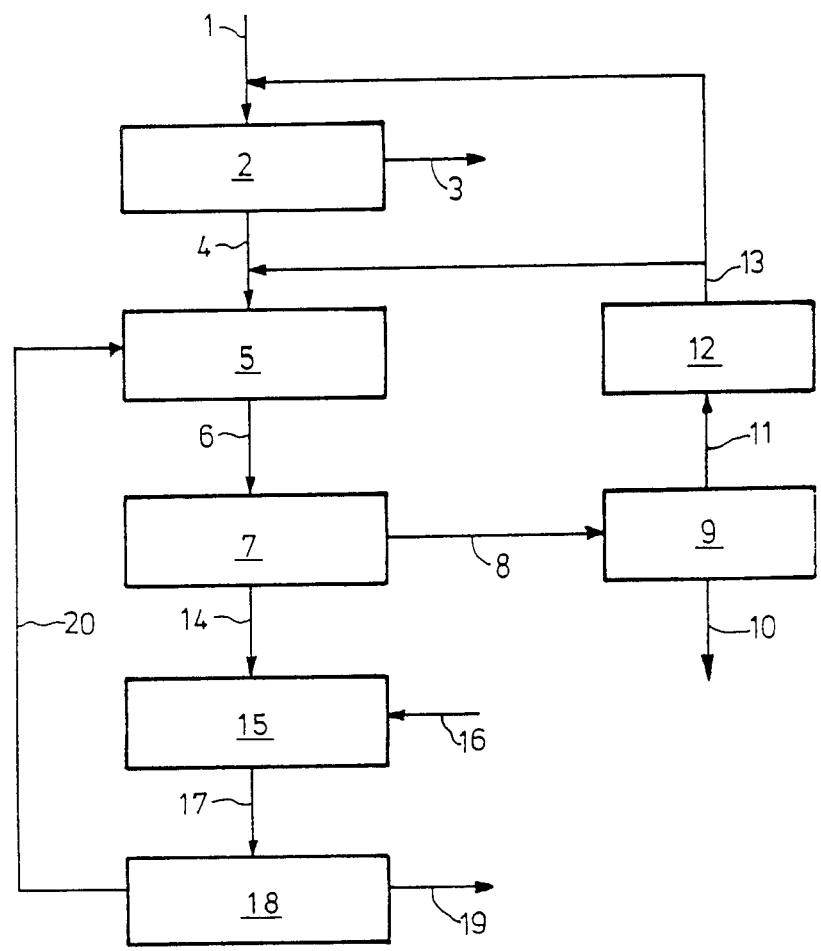
FIG. 3 illustrates a third embodiment of this invention by a block diagram flowchart. Like-numbered apparatus elements in the FIGS. are the same.

FIG. 3 illustrates a variation of the process according to the invention analogous to that of FIG. 1. In this case, the sump (20) obtained from the distillation of $TiCl_4$ (18) is not filtered but directly added (5) to the dechlorinated, crude $TiCl_4$ (4). From 5 to 25% of the volume (17) fed into the $TiCl_4$ distillation (18) is normally removed as sump (20) and mixed with the dechlorinated, crude $TiCl_4$ (4). The disadvantage of having a larger quantity of $TiCl_4$ to filter is normally compensated for by the advantage that only one filtration is required for the whole process.

The filters used are pressure filters, preferably of the type of leaf filters or cartridge filters, from which the filter cake may be discharged intermittently.

The process according to the invention affords great advantages, especially for processing raw materials with only a low titanium content, such as titanium slag, synthetic rutile, leucoxene, ilmenite or Brazilian anatas, because separation of the large amounts of solid chlorides from crude $TiCl_4$ by the distillation of $TiCl_4$ is particularly difficult and direct filtration of crude $TiCl_4$ can in these cases only be carried out with a very low filtration output.

The advantages of the process according to the invention will now be illustrated with the aid of Examples.

EXAMPLE 1 (CORRESPONDING TO FIG. 1)

Crude $TiCl_4$ obtained from the chlorination of rutile sand contained 1.5% by weight of solids, 1050 ppm of vanadium in the form of $VOCl_3$ or $VCl_4$ and 580 ppm of chlorine. The crude $TiCl_4$ (1) was heated to 125° C. in a stirrer vessel (2) with $TiCl_4$ condenser attached. Nitrogen containing $TiCl_4$ obtained from blow-drying the filter cake I (8) was blown into the gas space of the container for 20 minutes. The chlorine-nitrogen mixture resulting from the condensation of $TiCl_4$ was transferred to an exhaust gas scrubber.

After this treatment, the dechlorinated crude $TiCl_4$ (4) contained less than 10 ppm of chlorine. The filter cake II (22) consisting of the products of reduction of the vanadium was then introduced into the stirrer vessel and mixed (5) with the crude TiCl$_4$ (4). The mixture (6) was cooled to 80° C. and filtered with a Fundabac ® cartridge filter (DrM, Switzerland) at 5 bar (abs.) (7). The filtration output amounted on average to 2.8 m$^3$ of filtrate/h.m$^2$ of filter surface when the filter cake had reached a thickness of 25 mm. (When, for comparison, the filtration of crude TiCl$_4$ (1) was carried out without the addition of filter cake II (22), the filtration output was only 0.35 m$^3$/h.m$^2$ when the cake had reached a thickness of 18 mm).

When filtration (7) had been completed, the turbid liquid was discharged and the filter cake was blown dry with nitrogen at 100° C. for 20 minutes. The TiCl$_4$-containing nitrogen leaving the filter was used for the dechlorination (2) of the next batch of crude TiCl$_4$. The remaining TiCl$_4$ was evaporated (11) from the crumbly filter cake I (8) in an indirectly heated drier (9) and fed into the crude TiCl$_4$ (1) after condensation (12). The dry solids (10) were removed for treatment of the residues.

The filtrate (14) obtained from filtration I (7) was collected in an interim container and heated batchwise to 115° C. in a stirrer vessel (15), and 4 kg of diphenylamine per m$^3$ were added (16). After 5 minutes, the resulting supsension (17) was discharged into a container from which it was continuously fed into a stirrer vessel with heating jacket (18) from which pure TiCl$_4$ (19) was evaporated off and finally condensed. A proportion of the suspension concentrated in the evaporator (18) was left to overflow as sump (20) and then filtered through a Fundabac ® cartridge filter (21) after it had cooled to about 80° C. The filtrate (23) was added to the suspension (17) before the evaporation of TiCl$_4$ (18). The filter cake (22) was suspended in the dechlorinated, crude TiCl$_4$ (4) as described above, where it served as filtration aid for the filtration I (7). The filtration output (23) was about 3.2 m$^3$ of filtrate/h.m$^2$ of filter surface at a pressure of 4 bar (abs.) when the filter cake (22) had reached a thickness of about 25 mm.

The pure TiCl$_4$ (19) was colorless. It contained less then 2 ppm of vanadium and 28 ppm of SiCl$_4$.

EXAMPLE 2 (CORRESPONDING TO FIG. 2)

Crude TiCl$_4$ (1) containing 2.9% by weight of solids with 640 ppm of V and 590 ppm of chlorine was obtained from the chlorination of Brazilian anatase. The crude TiCl$_4$ was dechlorinated (2) as in Example 1. The dechlorinated, crude TiCl$_4$ (4) was cooled to about 70° C. and filtered (24) through a Fundabac ® cartridge filter at 5 bar (abs.). The cartridges of this filter were already covered with a layer of filter cake II (27) about 10 mm in thickness as precoat layer. When the filter cake reached a total thickness of about 15 mm, the filtration output in filtration I (24) was 0.8 m$^3$/h.m$^2$ of filter surface. (By comparison, when direct filtration of crude TiCl$_4$ (1) was carried out, the average filtration output obtained with a filter cake not more than 0.6 mm in thickness was 0.3 m$^3$/h.m$^2$. When filter cake II (27) was added to the dechlorinated, crude TiCl$_4$ (4) as in FIG. 1, an averge filtration output of 0.9 m$^3$/h.m$^2$ was obtained when the filter cake had a thickess of at the most about 15 mm.

The filter cake (25) was dried by a method analogous to that of Example 1.

The filtrate (14) was heated batchwise to 125° C. and 2.7 kg of diphenylamine per m$^3$ (16) were added (15). After cooling to about 75° C., the suspension (17) was filtered through a Fundabac ® cartridge filter at 3.5 bar (abs.) (26). The average filtration output was 6 m$^3$/h.m$^2$ until the maximum thickness of filtration cake of about 10 mm was reached. After discharge of the turbid liquor, the filter was directly supplied with dechlorinated, crude TiCl$_4$ (4) as described above (24).

Pure TiCl$_4$ (19) was distilled from the filtrate (28) of filtration II (26) in a horizontal evaporator wth condenser (29) attached. At the end of the horizontal evaporator remote from the inlet for filtrate, 5 to 10% of the quantity fed in (30) was withdrawn as sump and returned to the suspension (17). The pure TiCl$_4$ was colorless and contained less than 2 ppm of vanadium.

EXAMPLE 3 (CORRESPONDING TO FIG. 3)

Dechlorinated crude TiCl$_4$ (4) (as in Example 2) was mixed with the sump (20) of the TiCl$_4$ distillation (18) in a stirrer vessel (5). Filtration (7) and treatment of filter cake were carried out as in Example 1. The filtration output was 1.1 m$^3$/h.m$^2$ of filter surface at a maximum filter case thickness of 15 mm. The filtrate (14) was heated batchwise to 125° C. and 2.4 kg of diphenylamine per m$^3$ (16) were added (15). Pure TiCl$_4$ (19) was then distilled from the suspension (17) containing the reaction products in a stirrer vessel (18). About 10% of the volume (17) fed in were removed in the evaporator (18) as sump (20) containing solid components and mixed with the dechlorinated, crude TiCl$_4$ (5).

The pure TiCl$_4$ was colorless and contained less than 2 ppm of vanadium.

What is claimed is:

1. An improved process for the preparation of TiCl$_4$ comprising
    (a) chlorinating a raw material containing titanium and vanadium impurities to produce a crude TiCl$_4$ reaction product,
    (b) separating the crude reaction product into solid by-products and TiCl$_4$-containing liquid,
    (c) reacting the TiCl$_4$-containing liquid with a reducing agent whereby vanadium impurities are converted into solid compounds,
    (d) separating pure TiCl$_4$ from the solid vanadium containing reaction products, and
    (e) separating the solid by-products and reaction products from TiCl$_4$ is improved by adding solid products of the vanadium reduction reactions according to step (c) to the crude TiCl$_4$ reaction product prior to the separating step (b).

2. The process according to claim 1 wherein the separating in step (b) is by filtration.

3. The process according to claim 1 wherein the separating in step (d) is by filtration and the TiCl$_4$ is then purified by distillation.

4. The process according to claim 1 wherein TiCl$_4$ is separated from solid vanadium compounds in step (d) by distilling off TiCl$_4$.

5. The process according to claim 4 wherein the solid vanadium containing reaction products are added to the crude TiCl$_4$ reaction product as the distilland from step (d).

6. The process according to claim 4 wherein solids-containing distilland is filtered and the solids are added to the crude TiCl$_4$ reaction product.

7. The process according to claim 1 wherein the reducing agent is an organic amine.

8. The process according to claim 1 wherein the reducing agent is diphenyl amine.

9. The process according to claim 8 wherein the amount of diphenyl amine is 2.5–5 kilograms per kilogram of vanadium.

10. The process according to claim 1 wherein the reduction reaction of step (c) is at a temperature from 80°–125° C.

11. The process according to claim 1 wherein the crude TiCl$_4$ reaction product is dechlorinated prior to the addition of reduced vanadium compounds according to step (e).

* * * * *